(12) United States Patent
Kakumoto et al.

(10) Patent No.: US 7,443,438 B2
(45) Date of Patent: Oct. 28, 2008

(54) SOLID-STATE IMAGE-SENSING DEVICE WITH SELECTIVELY GROUPED PIXELS

(75) Inventors: Tomokazu Kakumoto, Nagaokakyo (JP); Kraisorn Throngnumchai, Yokohama (JP)

(73) Assignees: Konica Minolta Holdings, Inc., Tokyo (JP); Nissan Motor Co., Ltd., Yokohama-Shi (JP)

( * ) Notice: Subject to any disclaimer, the term of this patent is extended or adjusted under 35 U.S.C. 154(b) by 585 days.

(21) Appl. No.: 11/009,465

(22) Filed: Dec. 10, 2004

(65) Prior Publication Data

US 2005/0128328 A1   Jun. 16, 2005

(30) Foreign Application Priority Data

Dec. 12, 2003   (JP)   ............................. 2003-415225

(51) Int. Cl.
*H04N 3/14* (2006.01)
*H04N 5/335* (2006.01)

(52) U.S. Cl. ..................... 348/308; 348/302; 348/294

(58) Field of Classification Search ................ 348/308, 348/272

See application file for complete search history.

(56) References Cited

U.S. PATENT DOCUMENTS

| | | | |
|---|---|---|---|
| 5,721,422 A | * | 2/1998 | Bird ....................... 250/208.1 |
| 5,818,052 A | * | 10/1998 | Elabd ..................... 250/370.09 |
| 5,955,753 A | | 9/1999 | Takahashi ................... 257/292 |
| 6,756,576 B1 | * | 6/2004 | McElroy et al. ........... 250/208.1 |
| 6,765,613 B1 | * | 7/2004 | Barna et al. ................. 348/241 |
| 7,268,815 B1 | * | 9/2007 | Meynants .................... 348/294 |
| 2002/0054389 A1 | | 5/2002 | Takada et al. ................ 358/513 |
| 2002/0067416 A1 | * | 6/2002 | Yoneda et al. ............... 348/304 |
| 2002/0154233 A1 | * | 10/2002 | Yoshimura et al. .......... 348/308 |
| 2003/0231253 A1 | * | 12/2003 | Kakumoto ................... 348/308 |

FOREIGN PATENT DOCUMENTS

| | | | |
|---|---|---|---|
| JP | 11-313257 | * | 11/1999 |
| JP | 11-313257 A | | 11/1999 |
| JP | 2002-77733 A | | 3/2002 |

* cited by examiner

*Primary Examiner*—Lin Ye
*Assistant Examiner*—Hung H Lam
(74) *Attorney, Agent, or Firm*—Sidley Austin LLP

(57) ABSTRACT

A solid-state image-sensing element 1 is fed with, from a coupling controller 4, a signal φSv that couples together the photoelectric conversion portions of every predetermined number of vertically adjacent pixels and a signal φSh that couples together the photoelectric conversion portions of every predetermined number of horizontally adjacent pixels. This sets the numbers of pixels of which the photoelectric conversion portions are coupled together horizontally and vertically. A pixel output controller 5 feeds a signal that controls the connection between the photoelectric conversion portion and the signal output portion in each pixel, and, within each group of pixels so coupled together, signals are outputted from one of those pixels.

9 Claims, 6 Drawing Sheets

SOLID-STATE IMAGE-SENSING DEVICE WITH SELECTIVELY GROUPED PIXELS

BACKGROUND OF THE INVENTION

This application is based on Japanese Patent Application No. 2003-415225 filed on Dec. 12, 2003, the contents of which are hereby incorporated by reference.

1. Field of the Invention

The present invention relates to a solid-state image-sensing device having a plurality of pixels, and more particularly to a solid-state image-sensing device that can vary the sensitivity and resolution thereof to suite a given image-sensing subject or operation.

2. Description of Related Art

Conventionally, a solid-state image-sensing element that performs linear conversion operation to yield a signal linearly proportional to the amount of incident light has a narrow, specifically two-digit, dynamic range. Thus, when this type of solid-state image-sensing element is used to sense a subject having a wide-ranging brightness distribution, it does not output brightness information outside the dynamic range thereof. On the other hand, a different type of solid-state image-sensing element is conventionally known that performs logarithmic conversion operation to yield a signal logarithmically proportional to the amount of incident light. This type of solid-state image-sensing element has a wide, specifically five- to six-digit, dynamic range, and therefore, when it is used to sense a subject having a considerably wide brightness distribution, it can convert all the brightness information within the brightness distribution into an electrical signal and output it. With this type of solid-state image-sensing element, however, the sensible range is so wide relative to the brightness distribution of the subject that, in a low-brightness or high-brightness region within the sensible range, there is left a region where no brightness data is present. To overcome this inconvenience, the applicant of the present invention has ever proposed a solid-state image-sensing element of which the operation can be switched between the linear and logarithmic conversion operation mentioned above.

In a solid-state image-sensing device incorporating such a solid-state image-sensing element, to achieve a high frame rate, the solid-state image-sensing element, if it has a large number of pixels, needs to be operated by being fed with a high-frequency pulse signal. Driving a solid-state image-sensing element with a high-frequency pulse signal, however, causes it to consume high power. In addition, since the operation duration per cycle becomes short, the exposure duration becomes accordingly short. This makes it impossible to achieve sufficient exposure in each pixel, and thus makes the level of the signal obtained from the solid-state image-sensing element low. As a result, an image sensed with such a solid-state image-sensing device has low contrast. To avoid this, conventionally, scanning is performed on a "thinned-out" basis, specifically by making only part of the pixels in each row operate while keeping the others unoperating. This helps lower the frequency of the drive pulse signal.

In another conventionally proposed type of solid-state image-sensing device, between every two vertically adjacent pixels, the photoelectric conversion portions formed therein, each composed of a photodiode and a capacitor, can be coupled together to achieve high-sensitivity image sensing. In this solid-state image-sensing device, a MOS transistor serving as an output stage is provided for every two rows, and each pixel is provided with a switch that connects and disconnects such a MOS transistor to and from the node between photodiode and capacitor of the pixel.

These conventional techniques, however, have the following disadvantages. Thinned-out scanning keeps some pixels unoperating, and thus uses only a smaller number of pixels than are actually provided. This makes the solid-state image-sensing element incorporated in the solid-state image-sensing device equivalent to one having a lower aperture ratio, lowering the sensitivity thereof. On the other hand, in the solid-state image-sensing device described in the previous paragraph, pixel coupling is performed only vertically. This makes it impossible to switch sensitivities flexibly with respect to both the vertical and horizontal resolutions. Moreover, since the MOS transistors serving as the output stages are provided only one for every two rows, and thus each output stage is shared between two vertically adjacent pixels, reading electrical signals from all the pixels requires complicated control.

SUMMARY OF THE INVENTION

In view of the conventionally experienced inconveniences described above, it is an object of the present invention to provide a solid-state image-sensing device that can vary the vertical and horizontal resolutions and the pixel sensitivity thereof to suite the subject brightness and the frame rate.

To achieve the above object, according to one aspect of the present invention, a solid-state image-sensing device is provided with: a plurality of pixels, each pixel including a photoelectric conversion portion that outputs an electrical signal commensurate with the amount of incident light and a signal output portion that feeds a current to the photoelectric conversion portion and that outputs the electrical signal outputted from the photoelectric conversion portion. Here, the pixels are divided into groups each consisting of a plurality of vertically adjacent pixels and a plurality of horizontally adjacent pixels. Moreover, the coupling of the photoelectric conversion portions of the individual pixels can be switched among (a) a state in which, within each group of pixels, the photoelectric conversion portions of all the pixels of the group are coupled together, (b) a state in which, within each group of pixels, the photoelectric conversion portions of all the vertically adjacent pixels in each column are coupled together, and (c) a state in which, within each group of pixels, the photoelectric conversion portions of all the horizontally adjacent pixels in each row are coupled together. Furthermore, within each group of pixels, the electrical signals are outputted from the signal output portion of one of the pixels of which the photoelectric conversion portions are coupled together.

According to another aspect of the present invention, a solid-state image-sensing device is provided with: a plurality of pixels, each pixel including a photoelectric conversion portion that outputs an electrical signal commensurate with the amount of incident light and a signal output portion that feeds a current to the photoelectric conversion portion and that outputs the electrical signal outputted from the photoelectric conversion portion; first switches that electrically connect together and disconnect from one another the photoelectric conversion portions of vertically adjacent pixels; and second switches that electrically connect together and disconnect from one another the photoelectric conversion portions of horizontally adjacent pixels. Here, through the combination of connections achieved by the first and second switches, the photoelectric conversion portions of particular pixels are coupled together, and the electrical signals are outputted from the signal output portion of one of the pixels of which the photoelectric conversion portions are coupled together.

According to the present invention, even in a case where thinned-out scanning requires a high frame rate, lowering of sensitivity can be avoided. Moreover, whether to vertically or horizontally couple together the photoelectric conversion portions of pixels can be chosen. Thus, while lowering of sensitivity is minimized, lowering of horizontal or vertical resolution can also be avoided. While the number of pixels from which signals are outputted is varied, according to this number, the number of pixels of which the photoelectric conversion portions are coupled together can be varied. This makes it possible to vary, according to the brightness of the subject, the number of pixels of which the photoelectric conversion portions are coupled together so as to optimize the sensitivity of the pixels. Moreover, the number of pixels from which signals are outputted can be varied according to the resolution and the frame rate at which to perform image sensing. Furthermore, since the number of pixels coupled together is varied according to the number of output pixels, the number of output pixels can be switched without lowering the aperture ratio of the solid-state image-sensing device.

DETAILED DESCRIPTION OF PREFERRED EMBODIMENTS

Figure 1:
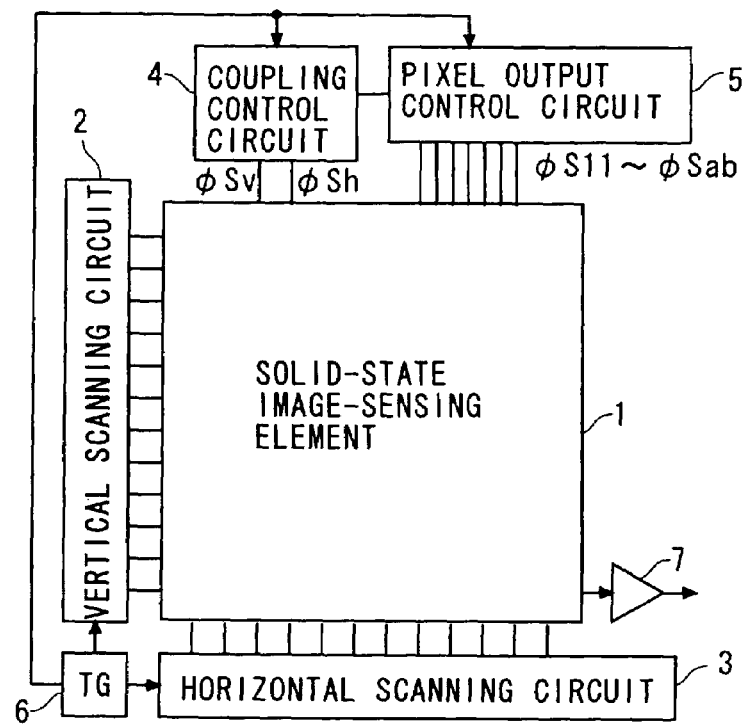
FIG. 1 is a block diagram showing the configuration of a solid-state image-sensing device embodying the invention.

Hereinafter, embodiments of the present invention will be described with reference to the drawings. FIG. 1 is a block diagram showing the configuration of a solid-state image-sensing device embodying the invention.

The solid-state image-sensing device shown in FIG. 1 includes: a solid-state image-sensing element 1 that has a plurality of pixels arrayed in a matrix; a vertical scanning circuit 2 that outputs a signal for vertically scanning the solid-state image-sensing element 1; a horizontal scanning circuit 3 that outputs a signal for horizontally scanning the solid-state image-sensing element 1; a coupling control circuit 4 that controls the coupling of the photoelectric conversion portions of the individual pixels provided in the solid-state image-sensing element 1; a pixel output control circuit 5 that controls, for each pixel, the connection between the photoelectric conversion portion and the signal output portion thereof; a timing generator 6 that feeds a timing signal to the vertical scanning circuit 2, horizontal scanning circuit 3, coupling control circuit 4, and pixel output control circuit 5 to set the operation timing of each of them; and an output amplifier 7 that amplifies the electrical signal from the solid-state image-sensing element 1 and then feeds it out of the solid-state image-sensing device.

In the solid-state image-sensing device configured as described above, signals synchronous with the timing signal from the timing generator 6 are fed from the vertical scanning circuit 2 and horizontal scanning circuit 3 to the solid-state image-sensing element 1, with the result that the solid-state image-sensing element 1 outputs, with respect to one pixel after another, an electrical signal commensurate with the amount of light incident on the photoelectric conversion portion thereof to the output amplifier 7. The output amplifier 7 then amplifies the electrical signal outputted from one pixel after another and feeds it, as an image signal, out of the solid-state image-sensing device.

In addition, the coupling control circuit 4 feeds the solid-state image-sensing element 1 with a signal φSh that controls the coupling of the photoelectric conversion portions of a horizontally adjacent pixels (where a is an integer number equal to or greater than two) and a signal φSv that controls the coupling of the photoelectric conversion portion of b vertically adjacent pixels (where b is an integer number equal to or greater than two). How these signals φSh and φSv are combined determines which pixels are coupled together, and also determines the number of pixels so coupled together. Moreover, the coupling control circuit 4 feeds the pixel output control circuit 5 with a signal that indicates the pixels that are coupled together. Fed with this signal from the coupling control circuit 4, the pixel output control circuit 5 divides the pixels into groups each consisting of a×b pixels that are coupled together through the combination of the signals φSh and φSv, and outputs, for each group, a×b signals φS11 to φSab that each connect together or disconnect from each other the photoelectric conversion portion and the signal output portion of the pixel located at the corresponding position within the group.

Here, when a high-level signal is fed as the signal φSh from the coupling control circuit 4 to the solid-state image-sensing element 1, the photoelectric conversion portions of a horizontally adjacent pixels in the solid-state image-sensing element 1 are coupled together; when a high-level signal is fed as the signal φSv from the coupling control circuit 4 to the solid-state image-sensing element 1, the photoelectric conversion portions of b horizontally adjacent pixels in the solid-state image-sensing element 1 are coupled together. When a high-level signal is fed as the signal φSxy($1 \leq x \leq a, 1 \leq y \leq b$) from the pixel output control circuit 5 to the solid-state image-sensing element 1, within each group, the photoelectric conversion portion and the signal output portion of the pixel located in row x and column y are electrically connected together so that the electrical signal generated by the photoelectric conversion portion is ready to be outputted from the signal output portion.

Now, the configuration and operation of the solid-state image-sensing element 1 used in the solid-state image-sensing device configured as described above will be described by way of two examples: one in which the pixels are divided into two-row, two-column groups and another in which they are divided into three-row, two-column groups.

First Example of Solid-State Image-Sensing Element

Figure 2:
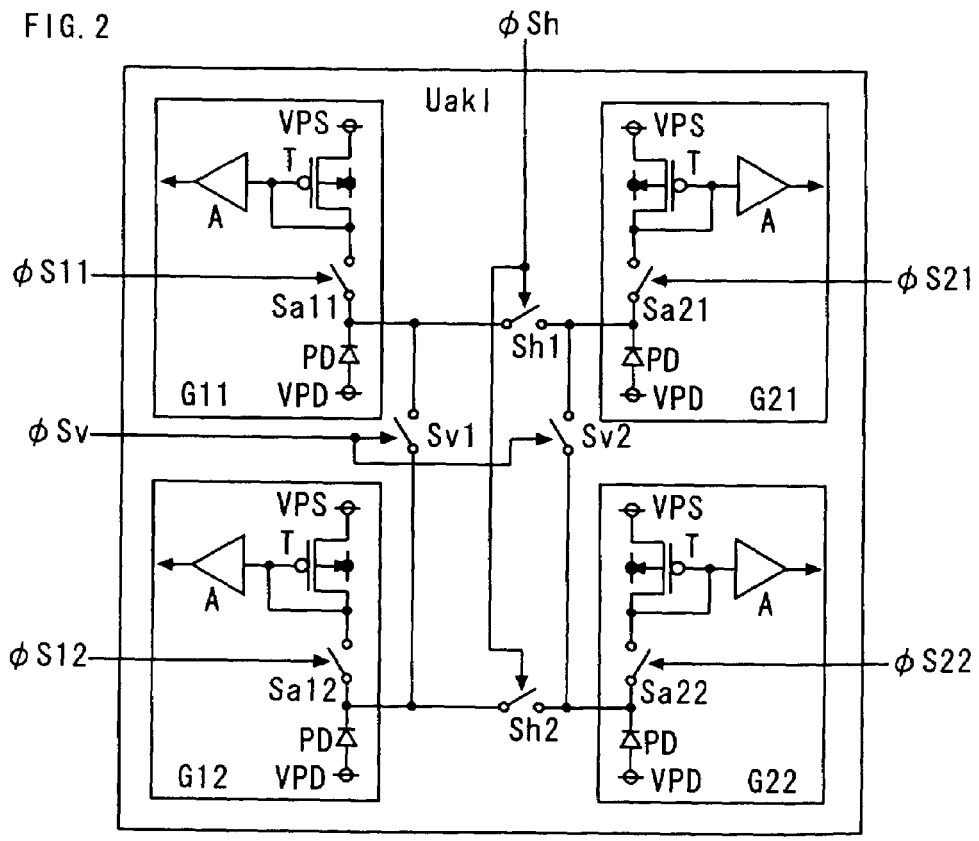
FIG. 2 is a circuit diagram showing an example of the pixel configuration of the solid-state image-sensing element used in the solid-state image-sensing device shown in FIG. 1.
Figure 3:
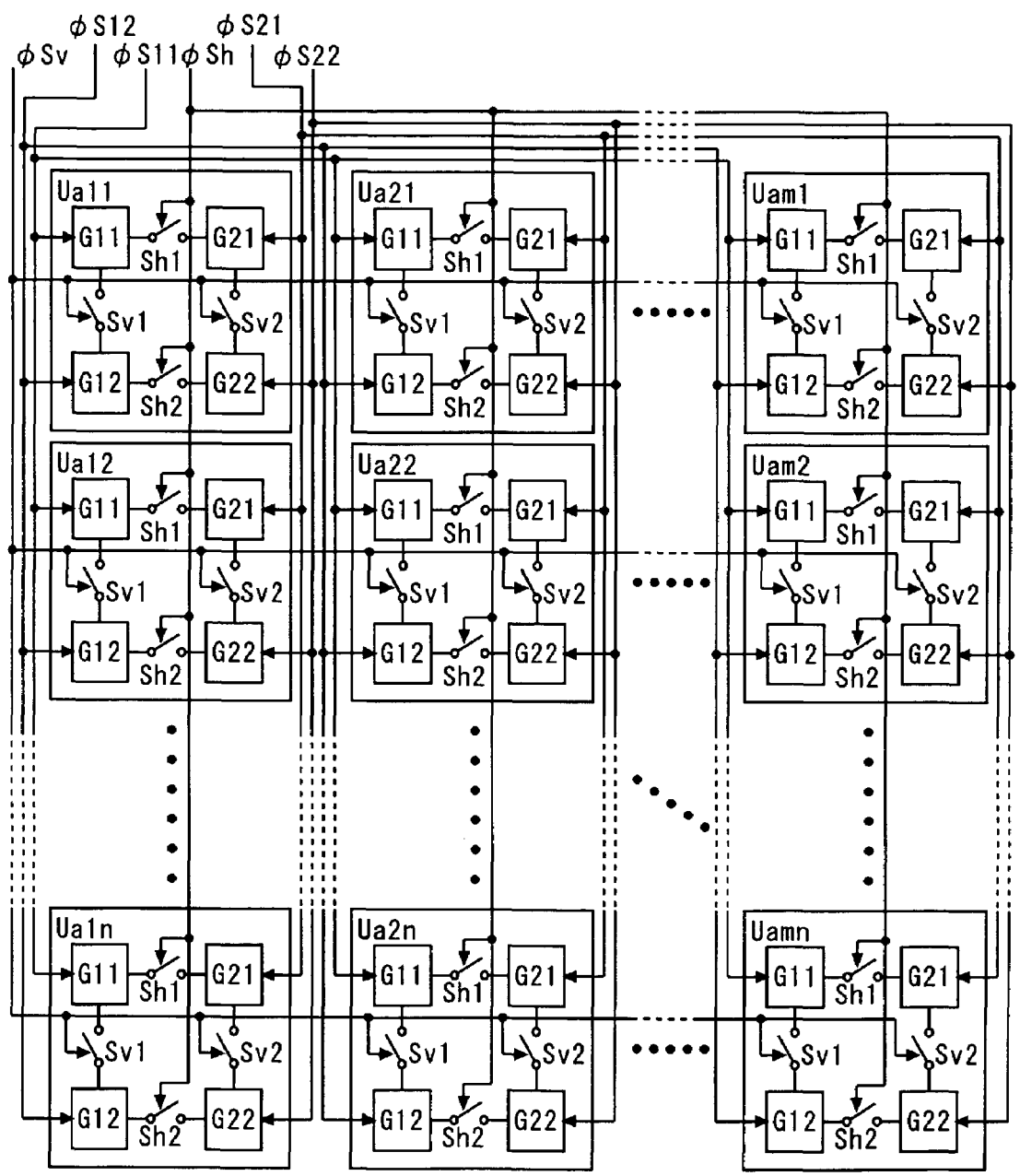
FIG. 3 is a block diagram showing an example of the configuration of the solid-state image-sensing element used in the solid-state image-sensing device shown in FIG. 1.

In the solid-state image-sensing element 1 of this example, as shown in FIG. 2, each pixel group Uakl($1 \leq k \leq m, 1 \leq l \leq n$) consists of four pixels G11 to G22 located in two adjacent rows and two adjacent columns, each pixel being composed of a photodiode PD that functions as a photoelectric conversion portion and a MOS transistor T and an amplifier circuit A that together function as a signal output portion. Moreover, as shown in FIG. 3, such pixel groups Ua11 to Uamn, each consisting of pixels G11 to G12, are arrayed in an m-row, n-column matrix. Here, k, l, n, and m are all natural numbers.

Thus, the pixel groups Ua11 to Uamn each consist of pixels G11 to G22, and these pixels in turn are each composed of, as shown in FIG. 2, a photodiode PD that receives a direct-current voltage VPD at the cathode thereof, a MOS transistor T that receives a direct-current voltage VPS at the source thereof, and an amplifier A to the input side of which are connected the drain and source of the MOS transistor T. The pixels G11 to G22 include switches Sa11 to Sa22, respectively, each provided between the node between the drain and gate of the MOS transistor T and the anode of the photodiode PD. These switches Sa11 to Sa22 are fed with signals φS11 to φS22, respectively. In FIGS. 2 and 3, only the signal lines by way of which the signals φSv and φSh and φS11 to φS22 are supplied are shown, and other signal lines, including output signal lines, are omitted.

Moreover, in each of the pixel groups Ua11 to Uamn, there are provided the following switches: a switch Sh1 that is connected between the anodes of the photodiodes PD of the horizontally adjacent pixels G11 and G21 and that is fed with the signal φSh; a switch Sh2 that is connected between the anodes of the photodiodes PD of the horizontally adjacent pixels G12 and G22 and that is fed with the signal φSh; a switch Sv1 that is connected between the anodes of the photodiodes PD of the vertically adjacent pixels G11 and G12 and that is fed with the signal φSv; and a switch Sv2 that is connected between the anodes of the photodiodes PD of the vertically adjacent pixels G21 and G22 and that is fed with the signal φSv.

With the solid-state image-sensing element 1 configured as described above, the pixel output control circuit 5 switches the levels of the signals φS11 to φS22 that are fed to the switches Sa11 to Sa22 of the pixels G11 to G22 provided in each of the pixel groups Ua11 to Uamn, and the coupling control circuit 4 switches the level of the signal φSh that is fed to the switches Sh1 and Sh2 provided in each of the pixel groups Ua11 to Uamn and also the level of the signal φSv that is fed to the switches Sv1 and Sv2 provided in each of the pixel groups Ua11 to Uamn. In this way, the numbers of pixels, as counted vertically and horizontally, from which to read signals are switched. That is, by switching the levels of the signals φS11 to φS22, φSh, and φSv individually, the vertical and horizontal resolutions are set. Now, the operation of the solid-state image-sensing device incorporating this solid-state image-sensing element 1 will be described.

1. Reading from all Pixels

In this case, the coupling control circuit 4 feeds a low-level signal as the signal φSh to the switches Sh1 and Sh2 provided in each of the pixel groups Ua11 to Uamn of the solid-state image-sensing element 1, and feeds a low-level signal as the signal φSv to the switches Sv1 and Sv2 provided in each of the pixel groups Ua11 to Uamn of the solid-state image-sensing element 1. In addition, the pixel output control circuit 5 feeds high-level signals as the signals φS11 to φS22 respectively to the switches Sa11 to Sa22 provided in the pixels G11 to G22 constituting each of the pixel groups Ua11 to Uamn of the solid-state image-sensing element 1.

As a result of the solid-state image-sensing element 1 being fed with signals from the coupling control circuit 4 and the pixel output control circuit 5 in this way, the switches Sa11 to Sa22 turn on and the switches Sh1, Sh2, Sv1, and Sv2 turn off.

Figure 4A:
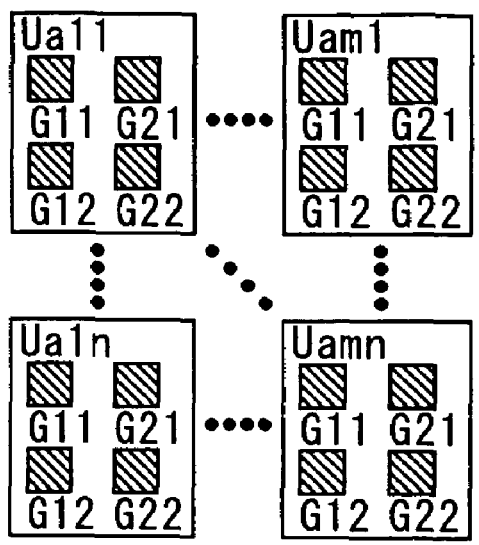
FIGS. 4A to 4D are diagrams showing the pixel coupling operation in the solid-state image-sensing device shown in FIGS. 2 and 3.

Thus, in each of the pixels G11 to G22, the anode of the photodiode PD and the drain of the MOS transistor T are connected together; moreover, the photodiodes PD of the pixels G11 to G22 are disconnected from one another. Hence, as shown in FIG. 4A, the four pixels G11 to G22 of each of the pixel groups Ua11 to Uamn each operate as an independent pixel. That is, the solid-state image-sensing element 1 operates as one having 2×m pixels horizontally and 2×n pixels vertically, i.e., 4×m×n pixels in total. In FIGS. 4A to 4D, the pixels targeted as those from which to read signals are indicated with hatching (the same applies in FIGS. 7A to 7D described later).

In each of the four pixels G11 to G22 of each of the pixel groups Ua11 to Uamn, when light is incident on the photodiode PD, the MOS transistor T feeds it with a photoelectric current. Here, the MOS transistor T operates in a subthreshold region, and accordingly, due to the subthreshold characteristic of the MOS transistor T, a voltage whose level is natural-logarithmically proportional to the photoelectric current appears at the gate of the MOS transistor T. This voltage at the gate of the MOS transistor T is then fed to the amplifier circuit A. Thus, as shown in FIG. 4A, each of the four pixels G11 to G22 of each of the pixel groups Ua11 to Uamn outputs an electrical signal that is natural-logarithmically proportional to the amount of incident light. The outputs from these pixels are sequentially read out by the vertical scanning circuit 2 and the horizontal scanning circuit 3, and are then amplified by the output amplifier 7 to produce an image signal.

2. Reading from Pixels Coupled Two-by-Two Vertically

In this case, the coupling control circuit 4 feeds a low-level signal as the signal φSh to the switches Sh1 and Sh2 provided in each of the pixel groups Ua11 to Uamn of the solid-state image-sensing element 1, and feeds a high-level signal as the signal φSv to the switches Sv1 and Sv2 provided in each of the pixel groups Ua11 to Uamn of the solid-state image-sensing element 1. In addition, the pixel output control circuit 5 feeds low-level signals as the signals φS11 and φS21 respectively to the switches Sa11 and Sa21 provided in the pixels G11 and G21 in each of the pixel groups Ua11 to Uamn of the solid-state image-sensing element 1, and feeds high-level signals as the signals φS12 and φS22 respectively to the switches Sa12 and Sa22 provided in the pixels G12 and G22 in each of the pixel groups Ua11 to Uamn of the solid-state image-sensing element 1.

As a result of the solid-state image-sensing element 1 being fed with signals from the coupling control circuit 4 and the pixel output control circuit 5 in this way, the switches Sa11 and Sa21 turn off, the switches Sa12 and Sa22 turn on, the switches Sh1 and Sh2 turn off, and the switches Sv1 and Sv2 turn on. Thus, in each of the pixels G12 and G22, the anode of the photodiode PD and the drain of the MOS transistor T are connected together; moreover, the photodiodes PD of the pixels G11 and G12 are connected together, and the photodiodes PD of the pixels G21 and G22 are connected together.

Figure 4B:
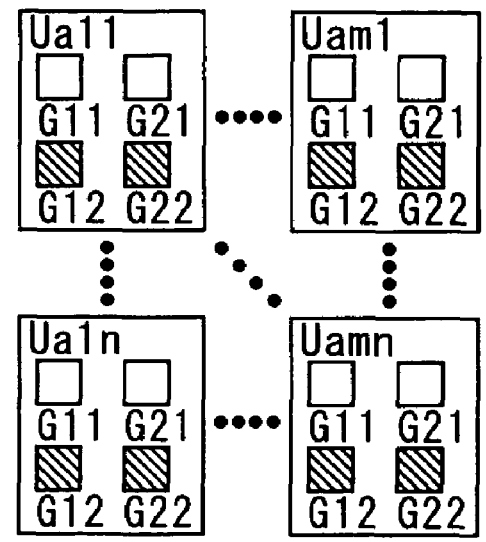

Hence, as shown in FIG. 4B, in each of the pixel groups Ua11 to Uamn, the two vertically adjacent pixels G11 and G12 are coupled together to operate as one pixel, and the two vertically adjacent pixels G21 and G22 are coupled together to operate as one pixel. That is, the solid-state image-sensing element 1 operates as one having 2×m pixels horizontally and n pixels vertically, i.e., 2×m×n pixels in total.

In each of the four pixels G11 to G22 of each of the pixel groups Ua11 to Uamn, when light is incident on the photodiode PD, the MOS transistor T of either of the pixels G12 and G22 feeds it with a photoelectric current. Here, the MOS transistor T of the pixel G12 feeds the photodiodes PD of the pixels G11 and G12 with a photoelectric current, and the MOS transistor T of the pixel G22 feeds the photodiodes PD of the pixels G21 and G22 with a photoelectric current. In the pixels G12 and G22, a voltage whose level is natural-logarithmically proportional to the photoelectric current appears at the gate of the MOS transistor T, and this voltage is then amplified by the amplifier circuit A. Thus, as shown in FIG. 4B, each of the two pixels G12 and G22 of each of the pixel groups Ua11 to Uamn outputs an electrical signal that is natural-logarithmically proportional to the amount of incident light. The outputs from these pixels G12 and G22, each output having the outputs of two vertically adjacent pixels added together, are sequentially read out by the vertical scanning circuit 2 and the horizontal scanning circuit 3, and are then amplified by the output amplifier 7 to produce an image signal.

3. Reading from Pixels Coupled Two-by-Two Horizontally

In this case, the coupling control circuit 4 feeds a high-level signal as the signal φSh to the switches Sh1 and Sh2 provided in each of the pixel groups Ua11 to Uamn of the solid-state image-sensing element 1, and feeds a low-level signal as the signal φSv to the switches Sv1 and Sv2 provided in each of the pixel groups Ua11 to Uamn of the solid-state image-sensing element 1. In addition, the pixel output control circuit 5 feeds high-level signals as the signals φS11 and φS12 respectively to the switches Sa11 and Sa12 provided in the pixels G11 and G12 in each of the pixel groups Ua11 to Uamn of the solid-state image-sensing element 1, and feeds low-level signals as the signals φS21 and φS22 respectively to the switches Sa21 and Sa22 provided in the pixels G21 and G22 in each of the pixel groups Ua11 to Uamn of the solid-state image-sensing element 1.

As a result of the solid-state image-sensing element 1 being fed with signals from the coupling control circuit 4 and the pixel output control circuit 5 in this way, the switches Sa11 and Sa12 turn on, the switches Sa21 and Sa22 turn off, the switches Sh1 and Sh2 turn on, and the switches Sv1 and Sv2 turn off. Thus, in each of the pixels G11 and G12, the anode of the photodiode PD and the drain of the MOS transistor T are connected together; moreover, the photodiodes PD of the pixels G11 and G21 are connected together, and the photodiodes PD of the pixels G12 and G22 are connected together.

Figure 4C:
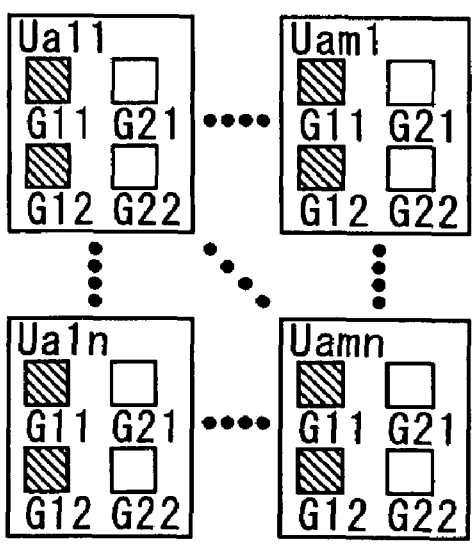

Hence, as shown in FIG. 4C, in each of the pixel groups Ua11 to Uamn, the two horizontally adjacent pixels G11 and G21 are coupled together to operate as one pixel, and the two horizontally adjacent pixels G12 and G22 are coupled together to operate as one pixel. That is, the solid-state image-sensing element 1 operates as one having m pixels horizontally and 2×n pixels vertically, i.e., 2×m×n pixels in total.

In each of the four pixels G11 to G22 of each of the pixel groups Ua11 to Uamn, when light is incident on the photodiode PD, the MOS transistor T of either of the pixels G11 and G12 feeds it with a photoelectric current. Here, the MOS transistor T of the pixel G11 feeds the photodiodes PD of the pixels G11 and G21 with a photoelectric current, and the MOS transistor T of the pixel G12 feeds the photodiodes PD of the pixels G12 and G22 with a photoelectric current. In the pixels G11 and G12, a voltage whose level is natural-logarithmically proportional to the photoelectric current appears at the gate of the MOS transistor T, and this voltage is then amplified by the amplifier circuit A. Thus, as shown in FIG. 4C, each of the two pixels G11 and G12 of each of the pixel groups Ua11 to Uamn outputs an electrical signal that is natural-logarithmically proportional to the amount of incident light. The outputs from these pixels G11 and G12, each output having the outputs of two horizontally adjacent pixels added together, are sequentially read out by the vertical scanning circuit 2 and the horizontal scanning circuit 3, and are then amplified by the output amplifier 7 to produce an image signal.

4. Reading from Pixels Coupled Four-by-Four

In this case, the coupling control circuit 4 feeds a high-level signal as the signal φSh to the switches Sh1 and Sh2 provided in each of the pixel groups Ua11 to Uamn of the solid-state image-sensing element 1, and feeds a high-level signal as the signal φSv to the switches Sv1 and Sv2 provided in each of the pixel groups Ua11 to Uamn of the solid-state image-sensing element 1. In addition, the pixel output control circuit 5 feeds a high-level signal φS12 to the switch Sa12 provided in the pixel G12 in each of the pixel groups Ua11 to Uamn of the solid-state image-sensing element 1, and feeds low-level signals as the signals φS11, φS21, and φS22 respectively to the switches Sa11, Sa21, and Sa22 provided in the pixels G11, G21, and G22 in each of the pixel groups Ua11 to Uamn of the solid-state image-sensing element 1.

Figure 4D:
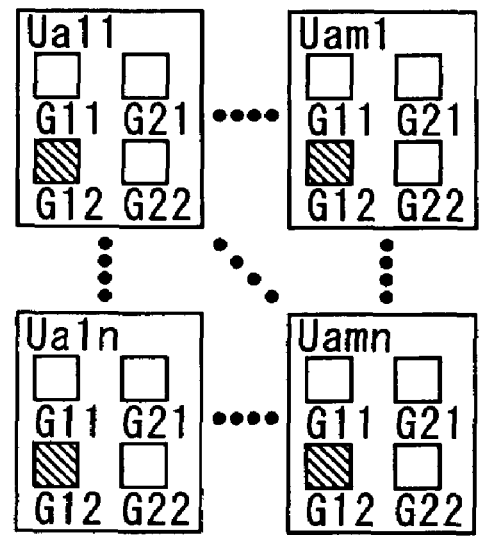

As a result of the solid-state image-sensing element 1 being fed with signals from the coupling control circuit 4 and the pixel output control circuit 5 in this way, the switch Sa12 turns on, the switches Sa11, Sa21, and Sa22 turn off, and the switches Sh1, Sh2, Sv1, and Sv2 turn on. Thus, in the pixel G12, the anode of the photodiode PD and the drain of the MOS transistor T are connected together; moreover, the photodiodes PD of the pixels G11 to G22 are connected together. Hence, as shown in FIG. 4D, in each of the pixel groups Ua11 to Uamn, the four horizontally and vertically adjacent pixels G11 to G22 are coupled together to operate as one pixel. That is, the solid-state image-sensing element 1 operates as one having m pixels horizontally and n pixels vertically, i.e., m×n pixels in total.

In each of the four pixels G11 to G22 of each of the pixel groups Ua11 to Uamn, when light is incident on the photodiode PD, the MOS transistor T of the pixel G12 feeds it with a photoelectric current. Here, the MOS transistor T of the pixel G12 feeds the photodiodes PD of the pixels G11 to G22 with a photoelectric current. In the pixel G12, a voltage whose level is natural-logarithmically proportional to the photoelectric current appears at the gate of the MOS transistor T, and this voltage is then amplified by the amplifier circuit A. Thus, as shown in FIG. 4D, only the pixel G12 of each of the pixel groups Ua11 to Uamn outputs an electrical signal that is natural-logarithmically proportional to the amount of incident light. With respect to one pixel group after another, the output from this pixel G12, the output having the outputs of four vertically and horizontally adjacent pixels added together, is sequentially read out by the vertical scanning circuit 2 and the horizontal scanning circuit 3, and are then amplified by the output amplifier 7 to produce an image signal.

Second Example of Solid-State Image-Sensing Element

Figure 5:
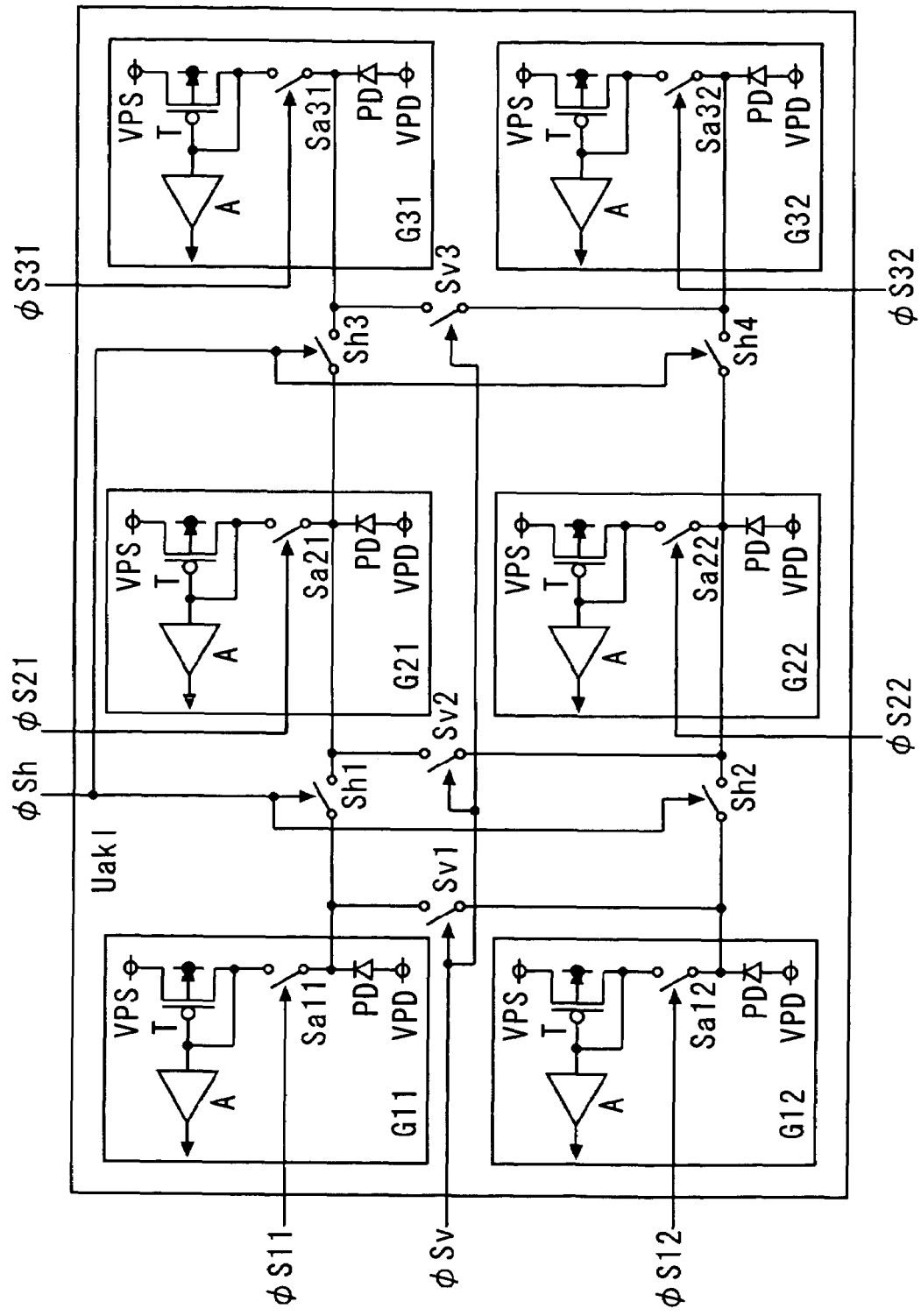
FIG. 5 is a circuit diagram showing another example of the pixel configuration of the solid-state image-sensing element used in the solid-state image-sensing device shown in FIG. 1.
Figure 6:
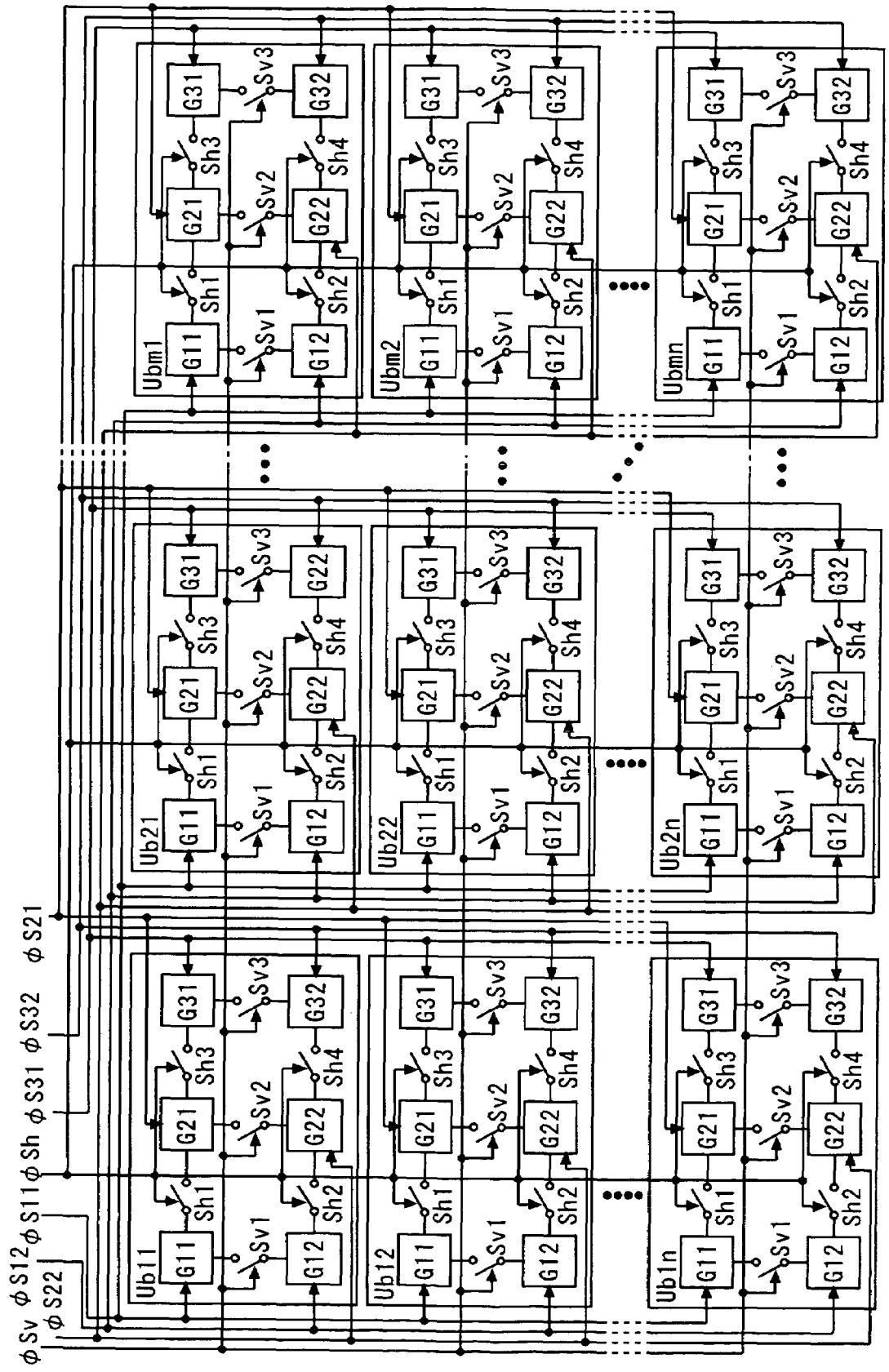
FIG. 6 is a block diagram showing another example of the configuration of the solid-state image-sensing element used in the solid-state image-sensing device shown in FIG. 1.

In the solid-state image-sensing element 1 of this example, as shown in FIG. 5, each pixel group Ubkl($1 \leq k \leq m, 1 \leq l \leq n$) consists of six pixels G11 to G32 located in three adjacent rows and two adjacent columns, each pixel being configured in a similar manner to those in the first example (FIG. 2). Moreover, as shown in FIG. 6, such pixel groups Ub11 to Ubmn, each consisting of pixels G11 to G32, are arrayed in an m-row, n-column matrix.

Thus, the pixel groups Ub11 to Ubmn each consist of pixels G11 to G32, and these pixels in turn are each composed of, as shown in FIG. 5 and as in the first example, a photodiode PD, a MOS transistor T, and an amplifier A. The pixels G11 to G32 include switches Sa11 to Sa32, respectively, each provided between the node between the drain and gate of the MOS transistor T and the anode of the photodiode PD. These switches Sa11 to Sa32 are fed with signals φS11 to φS32, respectively. Moreover, in each of the pixel groups Ub11 to Ubmn, there are provided, in addition to switches that find their counterparts in the first example, namely switches Sv1 and Sv2 that are fed with the signal φSv and switches Sh1 and Sh2 that are fed with the signal φSh, the following switches: a switch Sv3 that is connected between the anodes of the photodiodes PD of the pixels G31 and G32 and that is fed with the signal φSv; a switch Sh3 that is connected between the anodes of the photodiodes PD of the horizontally adjacent pixels G21 and G31 and that is fed with the signal φSh; and a switch Sh4 that is connected between the anodes of the photodiodes PD of the horizontally adjacent pixels G22 and G32 and that is fed with the signal φSh. In FIGS. 5 and 6, only the signal lines by way of which the signals φSv and φSh and φS11 to φS32 are supplied are shown, and other signal lines, including output signal lines, are omitted.

With the solid-state image-sensing element 1 configured as described above, as in the first example, by switching the levels of the signals φS11 to φS32, φSh, and φSv individually, the vertical and horizontal resolutions are set. Now, the operation of the solid-state image-sensing device incorporating this solid-state image-sensing element 1 will be described.

1. Reading from all Pixels

In this case, the coupling control circuit 4 feeds a low-level signal as the signal φSh to the switches Sh1 to Sh4 provided in each of the pixel groups Ub11 to Ubmn of the solid-state image-sensing element 1, and feeds a low-level signal as the signal φSv to the switches Sv1 to Sv3 provided in each of the pixel groups Ub11 to Ubmn of the solid-state image-sensing element 1. In addition, the pixel output control circuit 5 feeds high-level signals as the signals φS11 to φS32 respectively to the switches Sa11 to Sa32 provided in the pixels G11 to G32 constituting each of the pixel groups Ub11 to Ubmn of the solid-state image-sensing element 1. Thus, as shown in FIG. 7A, in each of the six pixels G11 to G32 of each of the pixel groups Ub11 to Ubmn, the MOS transistor T feeds the photodiode PD with a photoelectric current. Hence, the pixels G11 to G32 each operate as an independent pixel. That is, the solid-state image-sensing element 1 operates as one having 3×m pixels horizontally and 2×n pixels vertically, i.e., 6×m×n pixels in total.

2. Reading from Pixels Coupled Two-by-Two Vertically

In this case, the coupling control circuit 4 feeds a low-level signal as the signal φSh to the switches Sh1 to Sh4 provided in each of the pixel groups Ub11 to Ubmn of the solid-state image-sensing element 1, and feeds a high-level signal as the signal φSv to the switches Sv1 to Sv3 provided in each of the pixel groups Ub11 to Ubmn of the solid-state image-sensing element 1. In addition, the pixel output control circuit 5 feeds low-level signals as the signals φS11, φS21, and φS31 respectively to the switches Sa11, Sa21, and Sa31 provided in the pixels G11, G21, and G31 in each of the pixel groups Ub11 to Ubmn of the solid-state image-sensing element 1, and feeds high-level signals as the signals φS12, φS22, and φS32 respectively to the switches Sa12, Sa22, and Sa32 provided in the pixels G12, G22, and G32 in each of the pixel groups Ub11 to Ubmn of the solid-state image-sensing element 1.

Figure 7B:
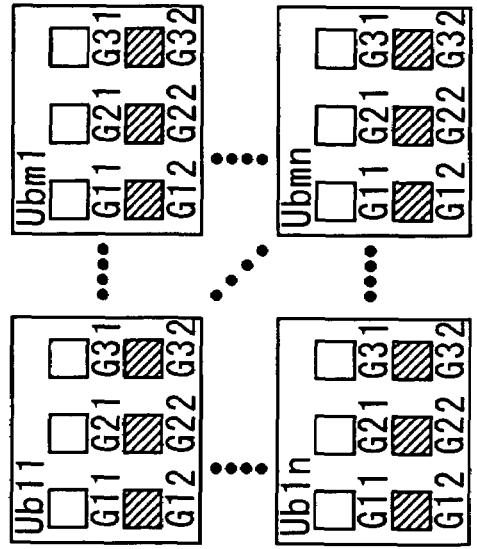
FIGS. 7A to 7D are diagrams showing the pixel coupling operation in the solid-state image-sensing device shown in FIGS. 5 and 6.

Thus, as shown in FIG. 7B, in each of the pixel groups Ub11 to Ubmn, the two vertically adjacent pixels G11 and G12 are coupled together to operate as one pixel, the two vertically adjacent pixels G21 and G22 are coupled together to operate as one pixel, and the two vertically adjacent pixels G31 and G32 are coupled together to operate as one pixel. Here, the MOS transistor T of the pixel G12 feeds the photodiodes PD of the pixels G11 and G12 with a photoelectric current, the MOS transistor T of the pixel G22 feeds the photodiodes PD of the pixels G21 and G22 with a photoelectric current, and the MOS transistor T of the pixel G32 feeds the photodiodes PD of the pixels G31 and G32 with a photoelectric current. The pixels G12, G22, and G32 output electrical signals. Thus, the solid-state image-sensing element 1 operates as one having 3×m pixels horizontally and n pixels vertically, i.e., 3×m×n pixels in total.

3. Reading from Pixels Coupled Three-by-Three Horizontally

In this case, the coupling control circuit 4 feeds a high-level signal as the signal φSh to the switches Sh1 to Sh4 provided in each of the pixel groups Ub11 to Ubmn of the solid-state image-sensing element 1, and feeds a low-level signal as the signal φSv to the switches Sv1 to Sv3 provided in each of the pixel groups Ub11 to Ubmn of the solid-state image-sensing element 1. In addition, the pixel output control circuit 5 feeds high-level signals as the signals φS11 and φS12 respectively to the switches Sa11 and Sa12 provided in the pixels G11 and G12 in each of the pixel groups Ub11 to Ubmn of the solid-state image-sensing element 1, and feeds low-level signals as the signals φS21, φS22, φS31, and φS32 respectively to the switches Sa21, Sa22, Sa31, and Sa32 provided in the pixels G21, G22, G31, and G32 in each of the pixel groups Ub11 to Ubmn of the solid-state image-sensing element 1.

Figure 7D:
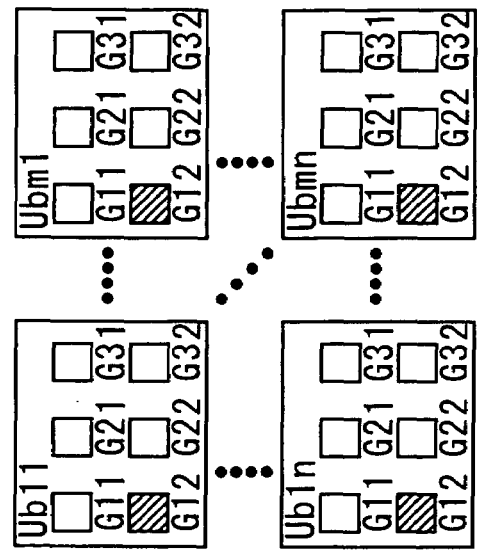
Figure 7A:
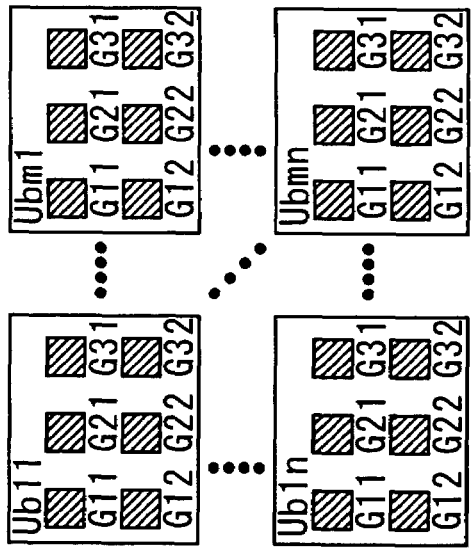
Figure 7C:
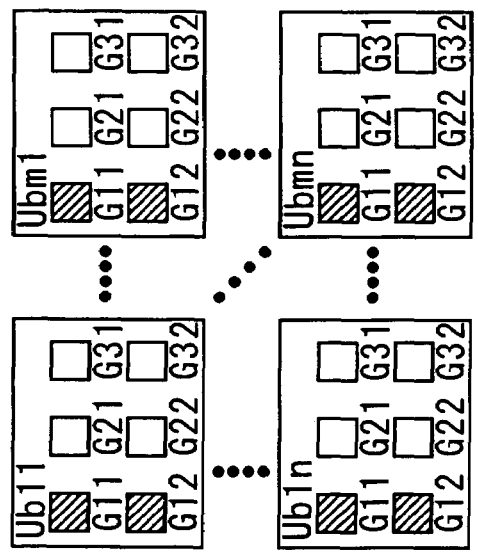

Thus, as shown in FIG. 7C, in each of the pixel groups Ub11 to Ubmn, the three horizontally adjacent pixels G11, G21, and G31 are coupled together to operate as one pixel, and the three horizontally adjacent pixels G12, G22, and G32 are coupled together to operate as one pixel. Here, the MOS transistor T of the pixel G11 feeds the photodiodes PD of the pixels G11, G21, and G31 with a photoelectric current, and the MOS transistor T of the pixel G12 feeds the photodiodes PD of the pixels G12, G22, and G32 with a photoelectric current. The pixels G11 and G12 output electrical signals. Thus, the solid-state image-sensing element 1 operates as one having m pixels horizontally and 2×n pixels vertically, i.e., 2×m×n pixels in total.

4. Reading from Pixels Coupled Six-by-Six

In this case, the coupling control circuit 4 feeds a high-level signal as the signal φSh to the switches Sh1 to Sh4 provided in each of the pixel groups Ub11 to Ubmn of the solid-state image-sensing element 1, and feeds a high-level signal as the signal φSv to the switches Sv1 to Sv3 provided in each of the pixel groups Ub11 to Ubmn of the solid-state image-sensing element 1. In addition, the pixel output control circuit 5 feeds a high-level signal as the signal φS12 to the switch Sa12 provided in the pixel G12 in each of the pixel groups Ub11 to Ubmn of the solid-state image-sensing element 1, and feeds low-level signals as the signals φS11, φS21, φS22, φS31, and φS32 respectively to the switches Sa11, Sa21, Sa22, Sa31, and Sa32 provided in the pixels G11, G21, G22, G31, and G32 in each of the pixel groups Ub11 to Ubmn of the solid-state image-sensing element 1.

Thus, as shown in FIG. 7D, in each of the pixel groups Ub11 to Ubmn, the six horizontally and vertically adjacent pixels G11 to G32 are coupled together to operate as one pixel. Here, the MOS transistor T of the pixel G12 feeds the photodiodes PD of the pixels G11 to G32 with a photoelectric current, and the pixel G12 outputs electrical signals. Thus, the solid-state image-sensing element 1 operates as one having m pixels horizontally and n pixels vertically, i.e., m×n pixels in total.

Configured as described above, the solid-state image-sensing element 1 of the first or second example is operated in the following manner. When the subject is bright and thus it can be sensed with low sensitivity, and in addition a high resolution image is needed, the solid-state image-sensing element 1 is operated in the state shown in FIG. 4A or 7A so that signals are read out from all the pixels. When the subject is dim and thus it needs to be sensed with high sensitivity, the solid-state image-sensing element 1 is operated in the state shown in FIG. 4D or 7D so that the pixels are coupled together vertically and horizontally within each pixel group. When the subject brightness and the frame rate require high horizontal resolution, the solid-state image-sensing element 1 is operated in the state shown in FIG. 4B or 7B so that the pixels are coupled together vertically within each pixel group. When the subject brightness and the frame rate require high vertical resolution, the solid-state image-sensing element 1 is operated in the state shown in FIG. 4C or 7C so that the pixels are coupled together horizontally within each pixel group. In this way, according to the subject brightness and the frame rate, the number of pixels that are coupled together is switched to permit the selection of an optimum pixel sensitivity and resolution.

In the solid-state image-sensing element 1 configured and operating as described above, each pixel thereof is assumed to perform logarithmic conversion operation. It is, however, also possible to configure each pixel in any other manner; for example, each pixel may be configured as disclosed in Japanese Patent Application Laid-Open No. H11-313257, or may be so configured as to have an integrating function. Alternatively, each pixel may be so configured as to perform liner conversion operation, or may be so configured as to be switchable between linear and logarithmic conversion operation as disclosed in Japanese Patent Application Laid-Open No. 2002-77733. The pixels of the solid-state image-sensing element 1 do not necessarily have to be divided into two-row, two-column or three-row, two-column pixel groups, but may be divided into a-row, b-column pixel groups, i.e., pixel groups of any other size.

The switches Sa11 to Sa32 connected between the photodiode PD and the MOS transistor T in each pixel may be shared as resetting switches for electrically disconnecting the photodiode PD and the MOS transistor T from each other when the pixels are reset and noise signals indicating sensitivity variations among the pixels are outputted. In this case, the pixel output control circuit 5 produces the signals φS11 to φS32 by performing AND operation between a timing signal for making the switches Sa11 to Sa32 operate as resetting switches and connection control signals for determining the connection between the photodiode PD and the MOS transistor T of each pixel according to the number of pixels of which the photodiodes PD are to be coupled together. The thus produced signals are then fed to the switches Sa11 to Sa32 of each pixel.

What is claimed is:

1. A solid-state image-sensing device comprising:
a plurality of pixels, each pixel including
   a photoelectric conversion portion that outputs an electrical signal commensurate with amount of incident light and
   a signal output portion that feeds a current to the photoelectric conversion portion and that outputs the electrical signal outputted from the photoelectric conversion portion, wherein the pixels are divided into groups each consisting of a plurality of vertically adjacent pixels and a plurality of horizontally adjacent pixels, wherein coupling of the photoelectric conversion portions of the individual pixels can be switched among
   (a) a state in which, within each group of pixels, the photoelectric conversion portions of all the pixels of the group are coupled together,
   (b) a state in which, within each group of pixels, the photoelectric conversion portions of all the vertically adjacent pixels in each column are coupled together, and
   (c) a state in which, within each group of pixels, the photoelectric conversion portions of all the horizontally adjacent pixels in each row are coupled together, and wherein, within each group of pixels, the electrical signals are outputted from the signal output portion of one of the pixels of which the photoelectric conversion portions are coupled together.

2. A solid-state image-sensing device as claimed in claim 1, wherein each pixel operates with a logarithmic conversion characteristic so as to output an electrical signal that is natural-logarithmically proportional to the amount of incident light.

3. A solid-state image-sensing device comprising:
a plurality of pixels, each pixel including
   a photoelectric conversion portion that outputs an electrical signal commensurate with amount of incident light and
   a signal output portion that feeds a current to the photoelectric conversion portion and that outputs the electrical signal outputted from the photoelectric conversion portion;
first switches that electrically connect together and disconnect from one another the photoelectric conversion portions of vertically adjacent pixels; and
second switches that electrically connect together and disconnect from one another the photoelectric conversion portions of horizontally adjacent pixels,
wherein, through combination of connections achieved by the first and second switches, the photoelectric conversion portions of particular pixels are coupled together, and the electrical signals are outputted from the signal output portion of one of the pixels of which the photoelectric conversion portions are coupled together.

4. A solid-state image-sensing device as claimed in claim 3, wherein the pixels are divided into groups each consisting of x (x≧1) vertically adjacent pixels and y (y≧1) horizontally adjacent pixels, and a coupling controller is provided that controls, on a group-by-group basis, connection and disconnection of the first and second switches.

5. A solid-state image-sensing device as claimed in claim 4, wherein the first and second switches are provided on a group-by-group basis, and
wherein the coupling controller feeds, on a group-by-group basis, a first switch control signal for controlling connection and disconnection of the first switches and a second switch control signal for controlling connection and disconnection of the second switches.

6. A solid-state image-sensing device as claimed in claim 5, wherein, through combination of the first and second switch control signals fed from the coupling controller, number of pixels of which the photoelectric conversion portions are coupled together to form each group is set.

7. A solid-state image-sensing device as claimed in claim 3, wherein, in each pixel, a third switch is provided that electrically connects together and disconnects from each other the photoelectric conversion portion and the signal output portion.

8. A solid-state image-sensing device as claimed in claim 7, wherein, in each pixel, the third switch also serves as a switch that disconnects the electric conversion portion and the signal output portion from each other when noise signals representing variations in sensitivity among different pixels are outputted.

9. A solid-state image-sensing device as claimed in claim 3, wherein each pixel operates with a logarithmic conversion characteristic so as to output an electrical signal that is natural-logarithmically proportional to the amount of incident light.

* * * * *